United States Patent [19]

Choby

[11] Patent Number: 4,601,223
[45] Date of Patent: Jul. 22, 1986

[54] FLAIL TUBE CUTTER

[75] Inventor: Edward J. Choby, Irwin, Pa.

[73] Assignee: Westinghouse Electric Corp., Pittsburgh, Pa.

[21] Appl. No.: 631,371

[22] Filed: Jul. 16, 1984

[51] Int. Cl.⁴ .............................................. B23D 21/14
[52] U.S. Cl. ........................................ 82/82; 30/103; 51/170 MT; 51/334; 166/55.7
[58] Field of Search .................. 82/46, 1.2, 47, 82, 82/100; 30/103, 104, 108; 166/55.7; 408/127; 51/170 PT, 170 MT, 261, 332, 335, 334

[56] References Cited

U.S. PATENT DOCUMENTS

| | | |
|---|---|---|
| 2,942,092 | 6/1960 | Cammann . |
| 3,049,738 | 8/1962 | Randell et al. . |
| 3,472,229 | 10/1969 | Kuntscher .......................... 30/103 |
| 3,717,056 | 2/1973 | Gracin et al. ........................ 82/82 |
| 3,783,721 | 1/1974 | Miller . |
| 3,810,402 | 5/1974 | Miller . |
| 4,142,429 | 3/1979 | Wilkins et al. . |
| 4,307,512 | 12/1981 | Phillips ................................ 30/103 |
| 4,369,573 | 1/1983 | Vitale . |
| 4,421,183 | 12/1983 | Collins, Jr. . |

Primary Examiner—Francis S. Husar
Assistant Examiner—Jerry Kearns
Attorney, Agent, or Firm—L. A. DePaul

[57] ABSTRACT

A flail tube cutter having an elongated cutting head circumscribed by a generally circular cutting blade, a means of rotating this cutting head, and a flexible shaft for coupling the cutting head to the rotating means is disclosed herein. The circular cutting blade of the cutting head includes a serration for defining two cutting teeth. Additionally, the cutting head includes a top portion located above the cutting blade for increasing the impact force of these cutting teeth against the inside wall of the tube being cut. The flail tube cutter of the invention provides a fast-acting tube cutter having a relatively small diameter which is easily snaked through tubes having local restrictions caused by either dents or internally mounted sleeves.

28 Claims, 4 Drawing Figures

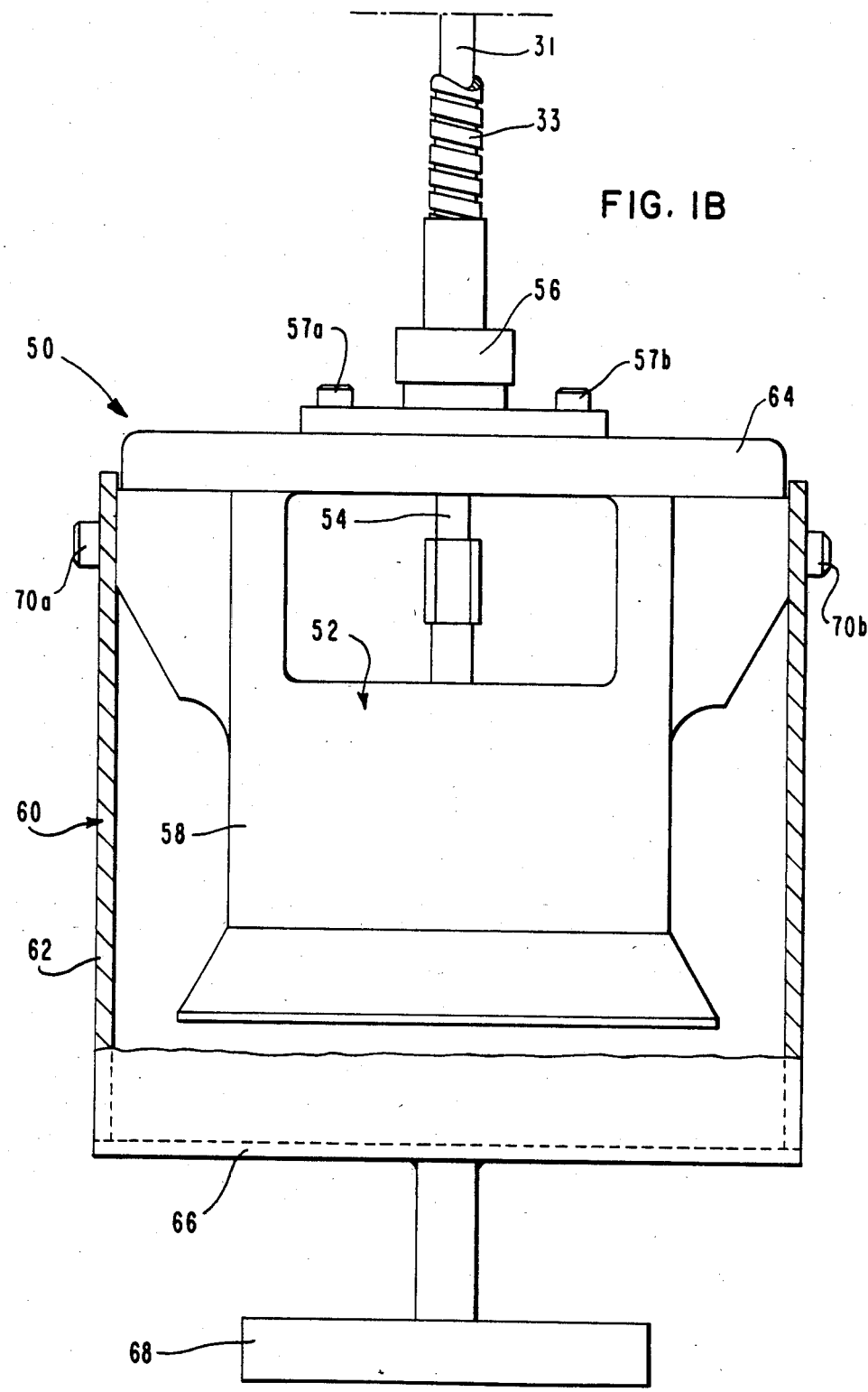
FIG. IB

4,601,223

FLAIL TUBE CUTTER

BACKGROUND OF THE INVENTION

1. Field of the Invention this invention relates to an internal-diameter tube cutter which cuts by means of a flailing action.

2. Description of the Prior Art

Internal-diameter tube cutters are generally known in the prior art. One of the most common types of such cutters includes a pair of opposing blades which are outwardly extendable by means of a cam. In operation, this type of cutter is slid into the tube to be cut, and the blade-extending cam is forcefully wedged through cam slots in the blades while the cutter is rotated. The cutting action of such cutters is similar to that of an ordinary household can opener, wherein the workpiece is rotated relative to the blade while a steady pressure causes the blade to slice into the wall of the tube.

While such internal-diameter tube cutters provide statisfactory results in many applications, certian problems may arise when tube cutters of this design are used to cut sample tubes in nuclear steam generators. For example, if the internal diameter of the tube to be sampled has been dented around the area of the generator support plates, or internally sleeved to prevent a leak condition from arising in the tube, it may not be possible to slide a conventional, internal-diameter tube cutter through the restrictions in the tube caused by either such dents or sleeves. If one attempts to solve this problem by merely reducing the width of this kind of tube cutter so it can slide through such restrictions, the mechanical strength of the cutter may be diminished to the point where it breaks down or wears out after a few tube cuts. Still another problem associated with such internal-diameter tube cutters is the relatively long period of time it takes to penetrate the walls of the tube with such a cutter. This problem is particularly acute when tube samples are being cut from a nuclear steam generator. In such a radioactive environment, the longer such a tube cutting process requires, the more radiation the maintenance personnel performing such operations will be exposed to.

Accordingly, there is a need for an internal-diameter tube cutter which is small enough in cross-section to easily slide past tube restrictions caused by either denting or sleeving, but mechanically strong enough so that it is capable of cutting through the walls of the tube without breaking or excessive wear. In addition to being small and durable, it would also be desirable if such a tube cutter were capable of rapidly penetrating the wall of the tube sought to be cut, in order to minimize the amount of radiation which maintenance personnel in nuclear steam generators are exposed to. Finally, it would be desirable if such a tube cutter were simple in design, and easy and inexpensive to manufacture and to use.

SUMMARY OF THE INVENTION

In its broadest sense, the invention is an apparatus for cutting the inside of a conduit such as a tube which generally comprises an elongated cutting head circumscribed by a cutting blade, a means for rotating the cutting head, and a flexible shaft for coupling the rotating means to one end of the elongated cutting head. When the cutting head is inserted into a tube and rotated by the rotating means via the flexible shaft, the blade of the cutting head is forceably flailed around the inside surface of the conduit, thereby cutting it.

The cutting blade of the apparatus may include a serration both for defining a pair of cutting teeth, and for displacing the axis of rotation away from the central axis of the cutting head so that the cutting head revolves in an eccentric motion when rotated. Additionally, the cutting head may include a top portion located above the blade for increasing the impact force of the blade as it is flailed around a circle in the inside of the conduit by the flexible shaft. The diameter of the circular blade may be between about 75% to 95% of the inner diameter of the tube being cut in order to allow sufficient clearance between the blade and the inside walls of the tube for a proper flailing action to occur. Preferably, the diameter of the circular blade is between about 82% to about 86% of the inner diameter of the conduit.

Additionally, the flexible shaft of the apparatus may be surrounded by a flexible shaft casing. This casing may function to prevent axial displacements of the cutting head of the apparatus during the cutting operation so that the circular cutting blade flails against the same, sharply defined circle on the inside walls of the tube until the tube walls are finally cut. Moreover, the apparatus of the invention may include an adjustable stop assembly including a cylindrical body having a plurality of clamping screws for positioning the blade of the cutting head at a desired point along the longitudinal axis of the tube sought to be cut. Finally, the apparatus of the invention may include a motor assembly having an output shaft coupled to the flexible shaft of the cutting head. The motor of the motor assembly may be capable of rotating the cutting head in excess of 15,000 rpms, and the back portion of the motor assembly may include a handle for facilitating the proper positioning of the cutting head prior to commencing a cutting operation.

BRIEF DESCRIPTION OF THE SEVERAL FIGURES

FIGS. 1A and 1B are side, partial cross-sectional views of the apparatus of the invention;

DETAILED DESCRIPTION OF THE PREFERRED EMBODIMENT

Figure 1A:
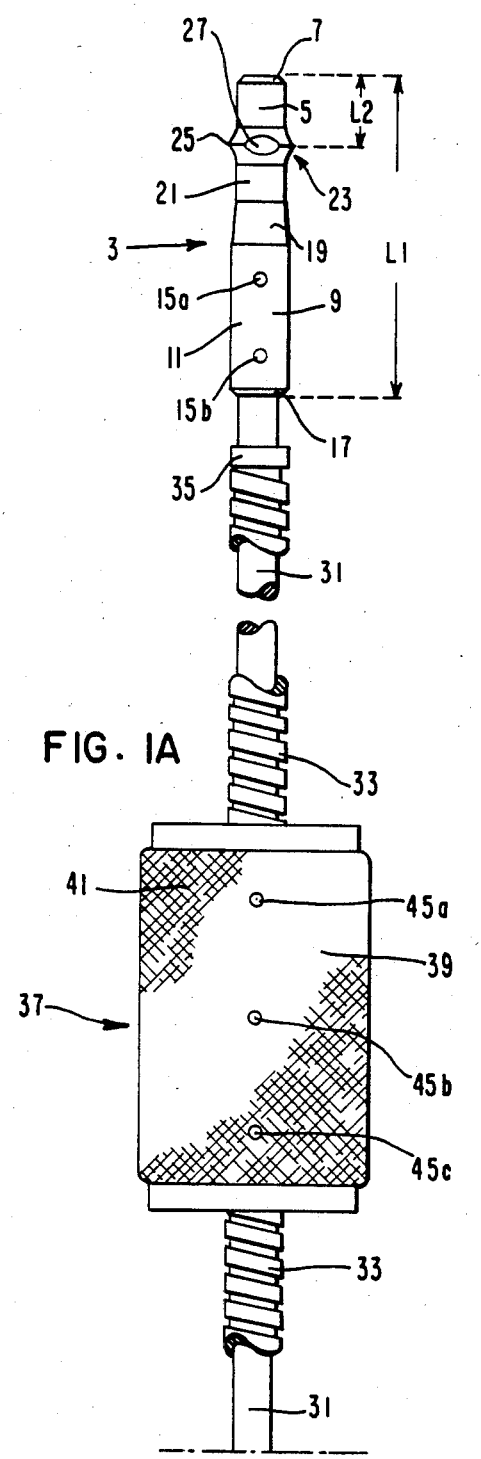
Figure 2:
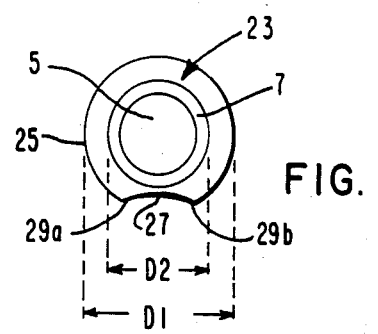
FIG. 2 is a top view of the cutting head of the invention.

With reference now to FIGS. 1A, 1B and 2, wherein like numerals designate like components, the preferred embodiment of the tube cutter 1 comprises a generally cylindrical cutting head 3 on a flexible shaft 31 which is coupled to a high speed electric motor 52. Preferably, the flexible shaft is surrounded by a gooseneck-type shaft casing 33 for purposes which will be discussed in more detail hereinafter. Additionally, the tube cutter 1 includes an adjustable stop assembly 37 having a cylindrical body which is axially movable along the shaft casing 33 by means of clamping screws 45a, 45b and 45c. The general function of the stop assembly 37 is to adjust the extent to which the cutting head 3 of the tube cutter 1 is inserted along the longitudinal axis of the tube to be cut.

Turning now to FIGS. 1A and 2, the cutting head 3 of the tube cutter 1 includes a cylindrical top portion 5 whose outer edge includes a bevel 7 as shown, as well as a bottom portion 9 including a coupling 11 for detachably coupling the cutting head 3 to the distal end of the flexible shaft 31. The coupling 11 is comprised of a centrally-disposed bore 13 (not shown) through which the distal end of the flexible shaft 31 is inserted. The coupling 11 further includes a pair of Allen head screws 15a and 15b for firmly clamping the end of the flexible shaft 31 into the aforementioned centrally-disposed bore 13. Like the top portion 5, the edge of the bottom portion 9 likewise preferably includes a bevel 17. Just above the bottom portion 9 of the cutting head 3 is a central, tapered portion 19. This tapered portion 19 preferably melds into a cylindrically-shaped neck 21. A circular blade 23 is disposed between top portion 5 and cylindrical neck 21 of the cutting head 3 as shown. The circular blade 23 is central to the performance of the cutting head 3 and preferably circumscribes the axis of rotation of the cylindrical cutting head 3 at right angles. Such positioning insures that the circular blade 23 will concentrate its cutting action along a relatively thin circle along the inside walls of the tube or other conduit when it is rapidly rotated by electric motor 52 in the manner to be described hereinafter. It should be noted that the profile of the edge 25 of the circular blade 23 is relatively blunt when compared to prior art internal-diameter cutters, coming to an angle of approximately 60°. However, the fact that the blade edge 25 is defined by a relatively broad angle lends a great deal of strength and durability to the blade 23. These qualities are of particular importance to the tube cutter 1 of the invention, since the cutting action is based primarily on the impact component of the flailing motion of the cutting head 3. While the edge 25 of the circular blade 23 could be tapered to a narrower angle, such a sharper blade edge would be more apt to wear either by chipping or by dulling, depending upon the relative brittleness or ductility of the material used. In the preferred embodiment, all parts of the cutting head 3 are integrally formed from a single piece of M-3 tool steel having a Rockwell hardness of between about 60 and 65.

The circular blade 23 preferably includes a single serration 27 as shown. With specific reference now to FIG. 2, this serration 27 performs at least three important functions. First, it defines a pair of cutting teeth 29a and 29b which greatly concentrate the impact-cutting force generated by the cutting head 23 as it is rotated and whipped around the inside surface of a tube 72 by electric motor 52. Second, the sharp edges defined by the serration 27 amplify the flailing component of the motion of the cutting head 3 by bouncing the cutting head 3 between the inner walls 75 of the tube 72. Like a train with a partially flattened wheel, the sharp edges defined by the serration 27 prevents any opportunity for a smooth, wheel-to-wheel engagement between the blade 23 and the inside wall of the tube 72. The third function that the serration 27 performs is that it displaces the axis of rotation of the cutting head 3 by a few degrees, thereby lending an eccentric element of rotational motion to the head 3. The rotational excentricity afforded by the serration 27 can play an important role in initiating the flailing motion of the head 3 against the walls of the tube 72 in situations where the head 3 is hung down into a tube 72, instead of inserted up through a bottom opening in a tube, since in the former case the head 3 may not be touching the inner walls of the tube 72 when the electric motor 52 is initially started up. The off-center wobble afforded by the serration 27 insures that the cutting head 3 will immediately begin to flail against the inner walls of the tube 72, regardless of the initial orientation of the cutting head 3 within the tube 72 during the initial start-up of the motor 52. In short, the serration 27 enhances the cutting effectiveness of the blade 23 both by providing a pair of cutting teeth 29a, 29b and an eccentric condition in the cutting head 3 which greatly accentuates the flailing component of motion in the head 3 as it whips and rotates against the inner walls 75 of the tube 72.

The net result of the provision of serration 27 in the generally circular cutting blade 23 is that the cutting head 3 cuts through the inner walls 75 of a tube 72 by means of a series of overlapping nicks which eventually become overlapping perforations as the tube 73 is finally cut. This cutting action contrasts sharply with prior art flexible shaft tube cutters which only employ centrifugal force to slowly rotate a circular blade around a circle in the walls of a tube 72, with much of the same cutting action as an ordinary household can opener. Because of the importance of the flail component of motion in the instant invention, the proper dimensioning of both the top portion 5 and the diameters of the blade 23 and the neck 21 are important, as is the choice of materials from which the cutting head 3 is formed.

The top portion 5 of the cutting head 3 performs two important functions. First, the mass of the top portion 5 substantially increases the amount of mechanical coupling between the aforementioned flail component of motion of the cutting head 3, and the edge 25 of the circular blade 23. While the relatively complex motions of the cutitng head inside the tube 72 make it difficult, if not impossible, to quantitatively explain the physical reasons why the mass in the top portion 5 increases the overall effectiveness of the cutting action of the edge of the blade 25, the applicant believes that the provision of the mass in the top portion 7 brings the generally circular blade 23 close to the "center of percussion", or second moment of the generally cylindrical mass defined by cutting head 3 and the end portion of the flexible shaft 31 and casing 33 coupled thereto.

The second function served by the top portion 5 is that it helps prevent the "flaring" of the cut edge of the tube after the blade edge 25 completely penetrates through the inner walls 75 of the tube. This function is best understood with reference to FIG. 3. In this Figure, it is clear that after the cut has been made, the upper end of the top portion 5 of the cutting head 3 will engage the inner walls 75 of that portion of the tube 72 positioned above the blade 23. Thus, both the impact component and the centrifugal component of the forces exerted by the cutting head 3 on the inside walls 75 of the tube 72 will be uniformly distributed around the edges of the mouths of the two new tubes created by the cut. However, if the top portion 5 of the cutting head 3 were absent, both the impact component and the centrifugal component of these forces would be exerted solely around the edge of the newly created tube mouth which is located below the blade 25. These forces would tend to flare out the newly created mouth of this tube. Since the tubes in many steam generators extend through the bores of one or more support plates, such a flaring of the newly-created mouth of the cut tube could make it difficult to draw the cut tube through these bores. Hence, the function of the top portion 5 in preventing this flaring is an important one, particularly in view of the fact that the tube cutter 1 of the invention is fully capable of cutting completely through the Inconel tubes used in nuclear steam generators in time periods of one second or less.

In the preferred embodiment illustrated in FIG. 1A, the length L2 of top portion 5 is 1.42 cm. when the length L1 of the cutting head 3 is 6.35 cm. Stated in more general terms, L2 is preferably about 22% of L1, although the applicant believes that the cutting head 3 would still be operable if L2 were anywhere between about 12% and 32% of L1.

Because the impact component of force is also related to the diameters of the cutting blade 23, the top portion 5, and the neck portion 21, the specific dimensioning of these components in the preferred embodiment will now be discussed in detail.

Figure 3:
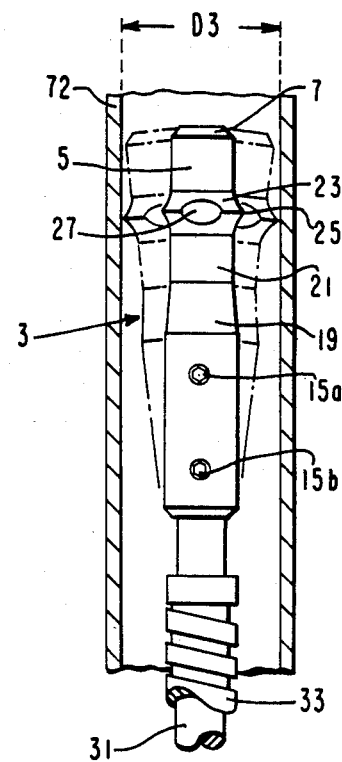
FIG. 3 is a side, partial cross-sectional view of the flail cutting head inside a tube, which illustrates the flail cutting action of the blade on the head.

The outer diameter of the blade 23 should be small enough so that the cutting head will naturally assume the flailing motion illustrated in FIG. 3, yet large enough so that the generally cylindrical body of the cutting head 3 as a whole will have sufficient mass to effectively convert the rotary motion supplied by the motor 52 into tube-cutting impact and centrifugal forces. If the diameter D1 of the blade 23 is too large relative to the inner diameter D3 of the tube 72, the edges of the teeth 29a and 29b formed by the serration 27 will strike the inner wall of the tube 72 at two shallow an angle to effectively nick or perforate it. Stated differently, the larger the generally circular outer diameter D1 of the generally circular blade 23 becomes relative to the inner diameter D3 of the tube 72, the more the blade 23 will act as though it is "journalled" within the inner wall of the tube 72 with the teeth 29a and 29b capable of providing only glancing blows to the inside walls 75 of the tube 73. On the other hand, if the outer diameter D1 of the blade 23 is too small relative to the inner diameter D3 of the tube 72, the cutting head 3 as a whole would not have sufficient mass to effectively convert the rotary motion of the high speed motor 52 into a cutting, flailing motion. This limitation arises because the diameter D2 of the top portion 7 and neck portion 21 of the cutting head 3 must always be smaller than the diameter D1 of the cutting blade. Since the mass of these particular components 5 and 21 is proportional to the square of their respective radii, it is clear that a relatively small percentage drop in the radius of these components can greatly affect the mass, and hence the cutting efficiency, of the blade 23. The applicant has found by empirical observation that, when the cutting head is formed from M-3 tool steel, the blade diameter D1 should be between 1.33 and 1.46 cm. when the inner diameter D3 of the tube 72 is 1.65 cm. Stated another way, blade diameter D1 ought to run between 81% and 88% of the inner diameter D3 of the tube 72, although applicant believes that a broader range of between 73% and 95% is operable. Th applicant has also empirically found that, for the same inner tube diameter D3, the diameter of both the top portion 7 and the neck 21 ought to be between 0.889 and 1.02 cm. (or between 51% and 62% of the inner tube diameter D3), although applicant again believes that a broader range of between about 40% and 90% is operable.

With reference now to FIGS. 1A and 1B, the cutting head 3 is coupled to the electric motor 52 of the tube cutter 1 by means of a flexible shaft 31 which is surrounded by a gooseneck-type casing 33. In the preferred embodiment, flexible shaft 31 and shaft casing 33 comprise a quarter-inch diameter flexible shaft assembly obtained from the Flex-Shaft Division of Calco Manufacturing, Inc., of Addison, Ill. The shaft casing 33 serves the important function of rigidifying the flexible shaft 31 during the cutting process so as to substantially eliminate any spurious flailing motion along the longitudinal axis of the tube 72 by the cutting head 3. If the shaft casing 33 is not present, the flexible shaft 31 may oscillate along the longitudinal axis of the tube 75, and cause the blade edge 25 of the cutting head 3 to shave out a cylindrically-shaped band of metal from the inner walls 75 of the tube 72, instead of cutting along a thin, circular arc in the tube wall 75. Preferably, the shaft casing 33 extends from shaft coupling 56 all the way up to within about 1 in. of the bevelled edge 17 of the cutting head 3. A conventional retainer ring 35 is preferably placed around the end of the shaft casing 33 nearest the cutting head 3 in order to make certain that the edges of the gooseneck-type spiral structure which forms the casing 33 will not snag the mouth of the tube 75 and unwind.

The preferred embodiment 1 further includes an adjustable stop assembly 37 fo positioning the blade 23 of the cutting head 3 along the longitudinal axis of a tube 72. The adjustable stop assembly 37 includes a cylindrical body 39 having a circular top wall 40, and a knurled outer surface 41 to facilitate handling. The shaft casing 33 extends through a centrally disposed bore 43 (not shown) in the cylindrical body 39. The position of cylindrical body 39 along the longitudinal axis of the shaft casing 33 is controlled by clamping screws 45a, 45b and 45c. When these screws are loosened, the shaft casing 33 is freely slidable through the aforementioned centrally disposed bore 43 in the cylindrical body 39. However, when these screws 45a, 45b and 45c are tightened, the cylindrical body 39 is locked into place on a point along the longitudinal axis of the shaft casing 33.

With specific reference now to FIG. 1B, the motor assembly 50 of the preferred embodiment generally comprises an electric motor 52 having an output shaft 54 which is coupled to the flexible shaft 31 in shaft casing 33 by means of coupling 56. The motor assembly 50 further includes an inner casing 58, and an outer casing 60 having a cylindrical body 62. In the preferred embodiment, the electric motor 52 and inner casing 58 are taken from a 1½ horsepower electric router motor capable of rotating its output shaft at a speed of approximately 25,000 rpm. For example, a catalog No. 9HT1749, 1½ hp. router manufactured by Sears, Roebuck & Co. of Chicago, Illinois may be used for both the electric motor 52 and the inner casing 58. The casing of such a commercially-available router may be conveniently attached to the cylindrical body 62 of the outer casing 60 by means of a pair of mounting bolts 70a, 70b. The front face of the outer casing 60 preferably further includes a front plate 64 onto which the shaft coupling 56 is mounted by bolts 57a, 57b. Finally, the cylindrical body 62 of the outer casing includes a back plate 66 having a handle 68 which helps render the entire tube cutter 1 manually positionable by the operator.

In operation, the operator selects the desired position of the cut in the tube 72 by loosening the clamping screws 45a, 45b and 45c in the cylindrical body 39 of the adjustable stop assembly 37, and sliding the cylindrical body 39 along the shaft casing 33 until the distance between the circular top wall 40 of the cylindrical body 39 and the circular blade 23 of the cutting head 3 corresponds to this desired position of the cut along the length of the tube 72. Next, the operator inserts the cutting head 3 up into the the open end of the tube 72, and snakes the head 3 up into the tube 72 until the upper surface of the circular top wall 40 engages the mouth of the tube 72. Preferably, the diameter D1 of the circular blade 23 of the cutting head 3 has been selected so that the cutting head 3 may easily slide through any restricted portions of the inner diameter D3 of the tube 72 caused by either the existence of tube sleeves or tube dents. Finally, when the tube cutter 1 is properly positioned, the operator actuates the electric motor 52. As illustrated in FIG. 3, the edge 25 of the blade 23 will begin to engage the inner walls 75 of the tube 73 around a thin circle through a force having both an impact component as well as a centrifugal component. As previously mentioned, the cutting head 3 of the tube cutter 1 is capable of penetrating the walls of the Inconel tubes used in nuclear steam generators in approximately one second. The tube cutter 1 is also capable of cutting such an Inconel tube section of the tube filled with water, although this protracts the cutting time to about 4 seconds. Interestingly, the applicant has observed in tests that it is not necessary to measure the time that the electric motor 52 is actuated in order to determine whether or not the inner wall of the tube 72 has been completely penetrated; rather, the applicant has found that the flailing cutting head 3 makes a distinctly different rattling sound within the tube 72 after the walls of the tube have been penetrated. Applicant has found it much more convenient to deactuate the electric motor 52 on the basis of this difference in sound, rather than by relying on the time period that the motor 52 is actuated.

What is claimed is:

1. An apparatus for cutting the inside surface of a conduit by a flailing motion, comprising:
   (a) an elongated, substantially cylindrical cutting head having a distal end and a proximal end which is circumscribed by a generally circular cutting blade having a serration for defining two cutting teeth for both cutting the inside wall of the conduit, and for generating a striking motion between the cutting blade and the conduit when the head is rotated therein wherein said blade circumscribes said cutting head at a point between 12% and 32% of the length of the cutting head as measured from the distal end;
   (b) a means for rotating said cutting head, and
   (c) a flexible shaft coupled to the proximal end of said cutting head and at the other end to said rotating means for both rotating said cutting head about its longitudinal axis and for flailing said cutting blade of said cutting head against the inside surface of said conduit when said cutting head is inserted therein and said rotating means rotates said shaft.

2. The apparatus defined in claim 1, wherein said conduit is a tube, and wherein the outer diameter of the cutting head is between about 40% and 90% of the inner diameter of the tube being cut.

3. The apparatus defined in claim 1, wherein said conduit is a tube, and wherein the outer diameter of the cutting head is between about 50% and 80% of the inner diameter of the tube being cut.

4. The apparatus defined in claim 1, wherein said conduit is a tube, and wherein the outer diameter of the cutting head is between about 51% and 62% of the inner diameter of the tube being cut.

5. The apparatus defined in claim 2, wherein the diameter of the circular blade is less than about 95% of the inner diameter of the tube being cut.

6. The apparatus defined in claim 2, wherein the diameter of the circular blade is between about 90% and 78% of the inner diameter of the tube being cut.

7. The apparatus defined in claim 2, wherein the diameter of the circular blade is between about 81% and 88% of the inner diameter of the tube being cut.

8. The apparatus defined in claim 5, wherein said blade circumscribes said cutting head at approximately the center of percussion of the cylindrical mass defined by said cutting head, and the distal end of said flexible shaft.

9. The apparatus defined in claim 6, wherein said blade circumscribes said cutting head at approximately the center of percussion of the cylindrical mass defined by said cutting head, and the distal end of said flexible shaft.

10. The apparatus defined in claim 7, wherein said blade circumscribes said cutting head at approximately the center of percussion of the cylindrical mass defined by said cutting head, and the distal end of said flexible shaft.

11. The apparatus defined in claim 1, wherein said means for rotating said cutting head rotates said flexible shaft at a speed of at least 15,000 rpm.

12. The apparatus defined in claim 1, further including a flexible casing for covering and partially rigidifying said flexible shaft.

13. The apparatus defined in claim 1, wherein said blade is formed from M-3 tool steel.

14. An apparatus having a cutting blade for cutting the inside surface of a tube by a flailing action, comprising:
   (a) an elongated, cylindrical cutting head having a proximal and a distal end and an outer diameter between about 50% and 80% of the inner diameter of the tube being cut, wherein said blade has a serration for defining two cutting teeth for cutting the inside wall of the conduit, and for generating a striking motion between the cutting blade and the conduit when the head is rotated therein, wherein said blade circumscribes said cutting head at a point between about 12% and 32% of the length of the cutting head as measured from the distal end;
   (b) means for rotating said cutting head, and
   (c) a flexible shaft connected to the proximal end of the cutting head coupling said cutting head to said rotating means and for flailing said cutting blade of said cutting head against the inside surface of said conduit when said cutting head is inserted therein and said rotating means rotates said shaft.

15. The apparatus defined in claim 14, wherein said serration in said blade displaces the axis of rotation of said cutting head away from its cylindrical axis.

16. The apparatus defined in claim 15, wherein said rotating means is capable of rotating said cutting head at a speed of at least 15,000 rpm.

17. The apparatus defined in claim 16, further including a flexible casing for surrounding and partially rigidifying said flexible shaft.

18. The apparatus defined in claim 17, wherein said cutting head is formed from M-3 tool steel having a Rockwell hardness of between about 60 and 65.

19. The apparatus defined in claim 18, wherein the diameter of the circular blade is between about 73% and 95% of the inner diameter of the tube being cut.

20. An apparatus for cutting the inside walls of a tube by a flailing action, comprising:

(a) an elongated, cylindrical cutting head having a distal end and a proximal end which is circumscribed by a generally circular cutting blade having a serration which defines at least one cutting tooth for both cutting the inside wall of the conduit, and for generating a striking motion between the cutting blade and the conduit when the head is rotated therein, and wherein said blade circumscribes said cutting head at a point at least 12% of the length of the cutting head from the distal end for both increasing the impact force of the blade tooth against the inner walls of the tube and for limiting the stroke of the blade tooth through the walls of the tube after said walls have been completely penetrated by said blade;

(b) a means for rotating said cutting head, and (c) a flexible shaft coupling said cutting head to said rotating means and for flailing said cutting blade against the walls of the tube when said rotating means rotates said cutting head within said tube.

21. The apparatus defined in claim 20, wherein the diameter of said top portion is between about 51% and 62% of the inner diameter of said tube.

22. The apparatus defined in claim 20, wherein said circular cutting blade has a diameter of between about 80% and 90% of the inner diameter of the tube.

23. The apparatus defined in claim 20, wherein said serration also displaces the axis of rotation of said cutting head away from its cylindrical axis.

24. The apparatus defined in claim 21, wherein said cutting head is formed from M-3 tool steel having a Rockwell hardness of between about 60 and 65.

25. The apparatus defined in claim 20, further including an adjustable stop assembly for adjusting the extent to which the cutting head is inserted into the tube.

26. A process for cutting the inner walls of a tube with a substantially cylindrical cutting head having a proximal and a distal end and which includes a circular cutting blade having a serration which defines at least one tooth for both cutting the inside wall of the conduit, and for generating a striking motion between the cutting head and the conduit when the head is rotated therein, wherein said circular cutting blade circumscribes said cutting head at a point between about 12% and 32% of the length of the cutting head as measured from its distal end, and said cutting head is coupled to a rotating means by means of a flexible shaft, comprising the steps of:

(a) inserting said cutting head into a tube, and (b) rotating said cutting head by said rotating means at a speed of at least 15,000 rpm until said circular cutting blade penetrates the walls of said tube.

27. The process defined in claim 26, further comprising the step of inserting said cutting head a desired distance into said tube by means of an adjustable stop assembly.

28. The process of claim 26, wherein said cutting head is rotated at a speed in excess of 20,000 rpm.

* * * * *